(12) United States Patent
Johnson (10) Patent No.: US 6,702,567 B2
(45) Date of Patent: Mar. 9, 2004

(54) MULTI-STATION SHUTTLE BLOW MOLDING MACHINE

(75) Inventor: David M. Johnson, Saline, MI (US)

(73) Assignee: R&B Machine Tool Company, Saline, MI (US)

( * ) Notice: Subject to any disclaimer, the term of this patent is extended or adjusted under 35 U.S.C. 154(b) by 153 days.

(21) Appl. No.: 09/990,805

(22) Filed: Nov. 14, 2001

(65) Prior Publication Data
US 2003/0091683 A1 May 15, 2003

(51) Int. Cl.$^7$ .......................... B29C 49/30; B29C 49/32
(52) U.S. Cl. .................. 425/532; 425/537; 425/538
(58) Field of Search ........................ 425/532, 537, 425/538, 541; B29C 49/30, 49/32

(56) References Cited

U.S. PATENT DOCUMENTS

| | | | |
|---|---|---|---|
| 1,813,721 A | 7/1931 | Wright | 425/453 |
| 3,998,576 A | 12/1976 | Frohn et al. | 425/532 |
| 4,421,472 A | 12/1983 | Martin, Jr. | 425/527 |
| 4,919,607 A | 4/1990 | Martin et al. | 425/531 |
| 4,998,873 A | 3/1991 | Martin et al. | 425/541 |
| 5,388,981 A | 2/1995 | Scharrenbroich | 425/541 |
| 5,399,083 A | 3/1995 | Wollschlager | 425/450 |
| 5,501,591 A | * 3/1996 | Effenberger | 425/538 |
| 5,576,034 A | 11/1996 | Kiefer et al. | 425/532 |
| 5,919,498 A | 7/1999 | Weber et al. | 425/503 |
| 5,971,741 A | 10/1999 | Weber | 425/535 |
| 6,471,907 B1 | * 10/2002 | Krall et al. | 425/532 |

FOREIGN PATENT DOCUMENTS

| | | | |
|---|---|---|---|
| JP | 2000313056 A | * 11/2000 | B29C/49/32 |
| WO | WO 01/23164 A1 | 4/2001 | |

* cited by examiner

*Primary Examiner*—Robert B. Davis
(74) *Attorney, Agent, or Firm*—Reising, Ethington, Barnes, Kisselle, P.C.

(57) ABSTRACT

A shuttle blow molding machine having two groups of mold units located on opposite sides of a series of workstations spaced along a horizontal workstation path. Each mold unit includes a mold that reciprocates in a direction transverse to the workstation path between a retracted position that is spaced from the workstation path and an extended position aligned with the workstation path. The mold units within each group are located in side-by-side relation adjacent each other and each group is indexed as a single unit along a path parallel to the workstation path. The transverse motion of the molds between their retracted and extended positions allows one group to be retracted out of the way while the other group advances through the workstations. The mold units sequence through repetitive cycles in which the mold units of the first and second groups are indexed in a forward direction through the workstations, and then are moved in a return direction along their respective paths back to their starting position. When moving in the forward direction, the molds are moved from their retracted position toward their extended position prior to entering the first workstation and then are moved back to their retracted position after leaving the last workstation. The mold units of the first group are indexed together sequentially through the stations followed by the mold units of the second group which are indexed together sequentially through the stations while the mold units of the first group return to their starting position.

50 Claims, 6 Drawing Sheets

MULTI-STATION SHUTTLE BLOW MOLDING MACHINE

TECHNICAL FIELD

This invention relates generally to blow molding machines and, more particularly, to shuttle blow molding machines that utilize a continuous parison extruder head.

BACKGROUND OF THE INVENTION

Blow molding machines of the type contemplated herein utilize a number of mold units that are moved sequentially through different workstations for such operations as label insertion, receiving a charge of parison, pressurized expansion of the parison within the mold, and removal of the cured article prior to another cycle of these operations. In a shuttle machine, the mold units are transferred between the different workstations using an indexing mechanism that provides either simple linear or compound translation of the mold units from one workstation to the next.

Various different sequencing approaches have been proposed over the years. See, for example, U.S. Pat. No. 3,998,576 to Frohn et al. in which each of a number of mold units are shifted along an inclined path first upwardly under an extruder head and then downwardly away from the extruder head, with the mold unit then being shifted laterally to make room for an adjacent mold unit to shift over so that it may then move into and out of position under the extruder head. U.S. Pat. No. 5,576,034 to Kiefer et al. discloses a shuttle-type machine in which mold units are shuttled along a path to a location under a takeout mechanism where they are opened for article removal. Thereafter, they are pivoted or otherwise shifted laterally underneath an extruder head to receive parison, then closed and shifted back in place and shuttled to the next position.

In high production capacity blow molding machines, maximizing the output rate of the machine requires a design that minimizes the dwell time at each station and the indexing time between stations. However, there are additional considerations as well. For example, although the cure time for a blown article can be controlled to some extent by cooling of the mold, there is a minimum amount of time necessary before the article is sufficiently cured to be removed from the mold. In high production machines, this minimum cure time can be problematic, as the cure time may be ten times (or more) longer than the amount of time for the slowest of the workstations to carry out its operation. One way to accommodate this cure time is to increase the total indexing period (that is, the period of time that elapses between indexing steps) to slow down the machine to a rate that provides enough cure time before reaching the takeout station. A disadvantage of this approach is that it artificially reduces the throughput rate of the machine from what it could otherwise accomplish. Another solution is to increase the number of mold units to a large enough number that by the time any one mold unit has cycled through back to the takeout station, the article has had sufficient time to cure even though the machine is running as fast as its slowest workstation and the indexing mechanism allows. Such an approach may involve using twelve or more mold units on a single machine, in which case the actual layout and sequencing of the mold units can have a considerable impact on, for example, the total area required for the machine.

SUMMARY OF THE INVENTION

The present invention is directed to a shuttle blow molding machine in which two groups of mold units are located on opposite sides of a series of workstations spaced along a horizontal workstation path, with the mold units each including a mold that can advance from a retracted position that is offset from the workstation path to an extended position that is aligned with the workstation path. The blow molding machine includes an extruder head and a takeout mechanism both located along the workstation path. Each of the mold units has, in addition to the mold, a carriage, clamp, and blow pin assembly. The mold includes a pair of mold halves located in the clamp with the mold being movable by the clamp between an open position, in which the mold halves are spaced from each other, and a closed position, in which the mold halves are mated together to define one or more mold cavities. The blow pin assembly is supported by the clamp and includes at least one blow pin that is movable between a retracted position away from the mold and an inserted position in which the blow pin is located within a corresponding hole in the mold to deliver pressurized gas to the corresponding mold cavity. The clamp is mounted on the carriage with the carriage being movable in a direction transverse to the horizontal workstation path such that the mold can reciprocate between the retracted and extended positions. The mold units within the first group are located in side-by-side relation adjacent each other and are movable as a group along a first path that is parallel to the workstation path. Similarly, the mold units within the second group are located in side-by-side relation adjacent each other and are movable as a group along a second path that is parallel to the workstation path. Each group can be indexed along its parallel path to successively pass each mold within the group through the various workstations. The transverse motion of the molds between their retracted and extended positions allows one group to be retracted out of the way while the other group advances through the workstations.

In accordance with another aspect of the invention, there is provided a shuttle blow molding machine which implements a sequencing process in which two groups of mold units are alternately indexed past a number of workstations in a cyclical fashion. As mentioned above, the machine includes an extruder head and takeout mechanism located along a workstation path, with first and second groups of mold units located on opposite sides of the workstation path and each having a mold that can move in a direction transverse to the workstation path between a retracted and extended position. The machine further includes first and second indexers connected to the first and second groups of mold units, respectively, with each of the indexers being operable to move its associated group of mold units together along a path that is parallel to the workstation path. The machine also includes a controller connected to the mold units and indexers. The controller is operable to advance the mold units through repetitive cycles in which the mold units of the first and second groups are indexed in a forward direction along their respective paths from a starting position, through the takeout mechanism and extruder head stations, to a end position, and then are moved in a return direction along their respective paths from the end position back to the starting position. When the mold units are moving in the forward direction, the molds are moved from their retracted position toward their extended position prior to entering the takeout station and then are moved back to their retracted position after leaving the extruder head. The mold units of the first group are indexed together sequentially through the stations followed by the mold units of the second group which are indexed together sequentially through the stations while the mold units of the first group return to their starting position.

In accordance with another aspect of the invention, there is provided a shuttle blow molding machine having a number m of adjacent workstations spaced along a horizontal workstation path and first and second groups of mold units, each group having a number n of adjacent mold units. The two groups of mold units are located on opposite sides of the workstation path and, as above, each of the mold units includes a mold that is movable in a direction transverse to the workstation path such that the mold can reciprocate between a retracted position, in which the mold is spaced from the workstation path, and an extended position, in which the mold is centered along the workstation path. Each group of mold units indexes along a path parallel to the workstation path among at least 2(n−1)+m index positions. Preferably, there are at least 2n+m index positions.

The mold units of each group can have individual bases that are connected together to form a tram that is moved as a single unit along its parallel path. The bases can be connected together in a manner that permits the addition or removal of mold units, as well as adjustments to the center distances between the mold units. The relative positioning of the workstations can also be adjusted to match these center distances.

BRIEF DESCRIPTION OF THE DRAWINGS

An exemplary embodiment of the invention will hereinafter be described in conjunction with the appended drawings, wherein like designations denote like elements, and wherein.

DETAILED DESCRIPTION OF THE PREFERRED EMBODIMENT

Figure 1:
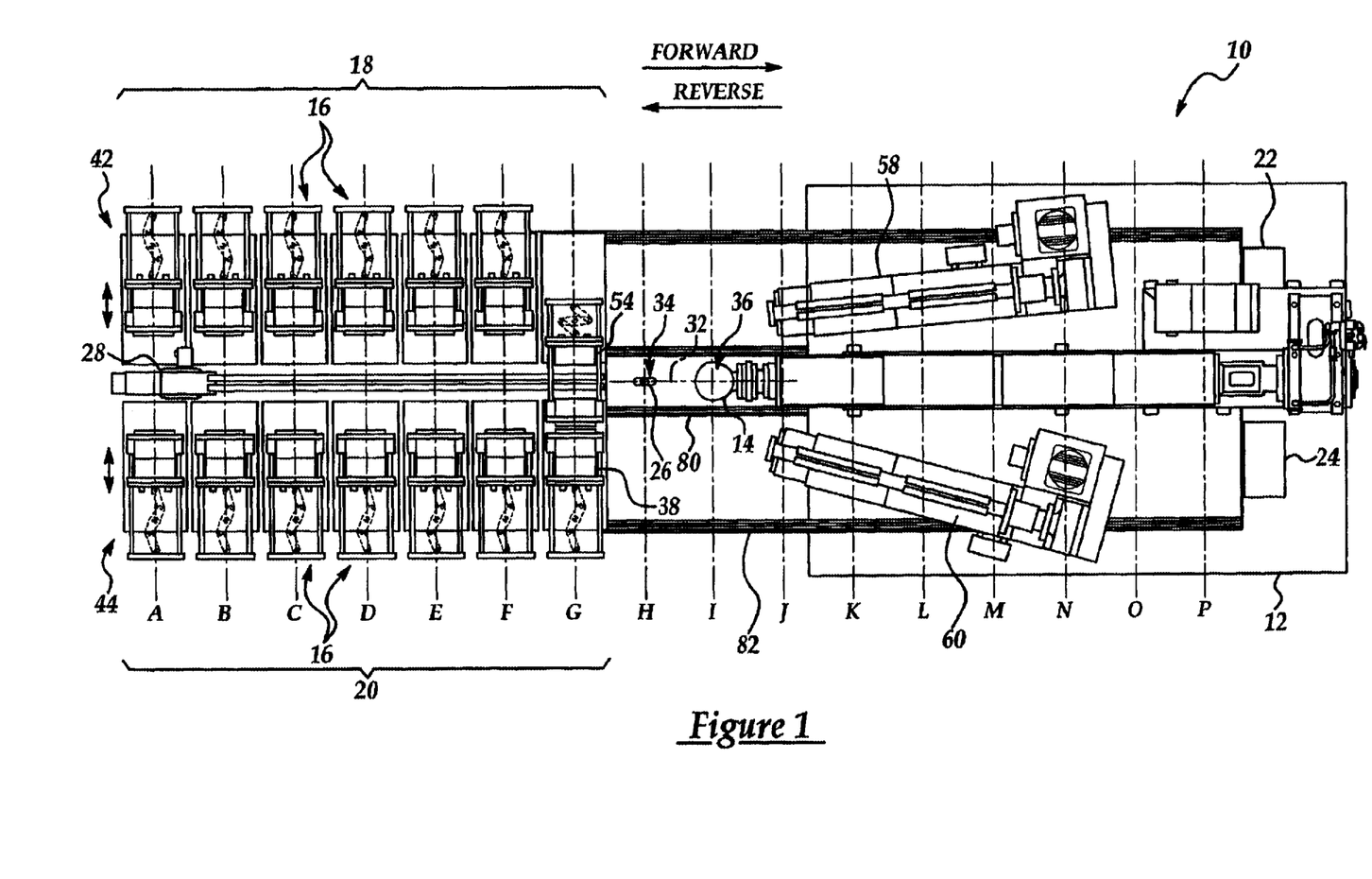
FIG. 1 is a plan view of a shuttle blow molding machine constructed in accordance with the invention.
Figure 2:
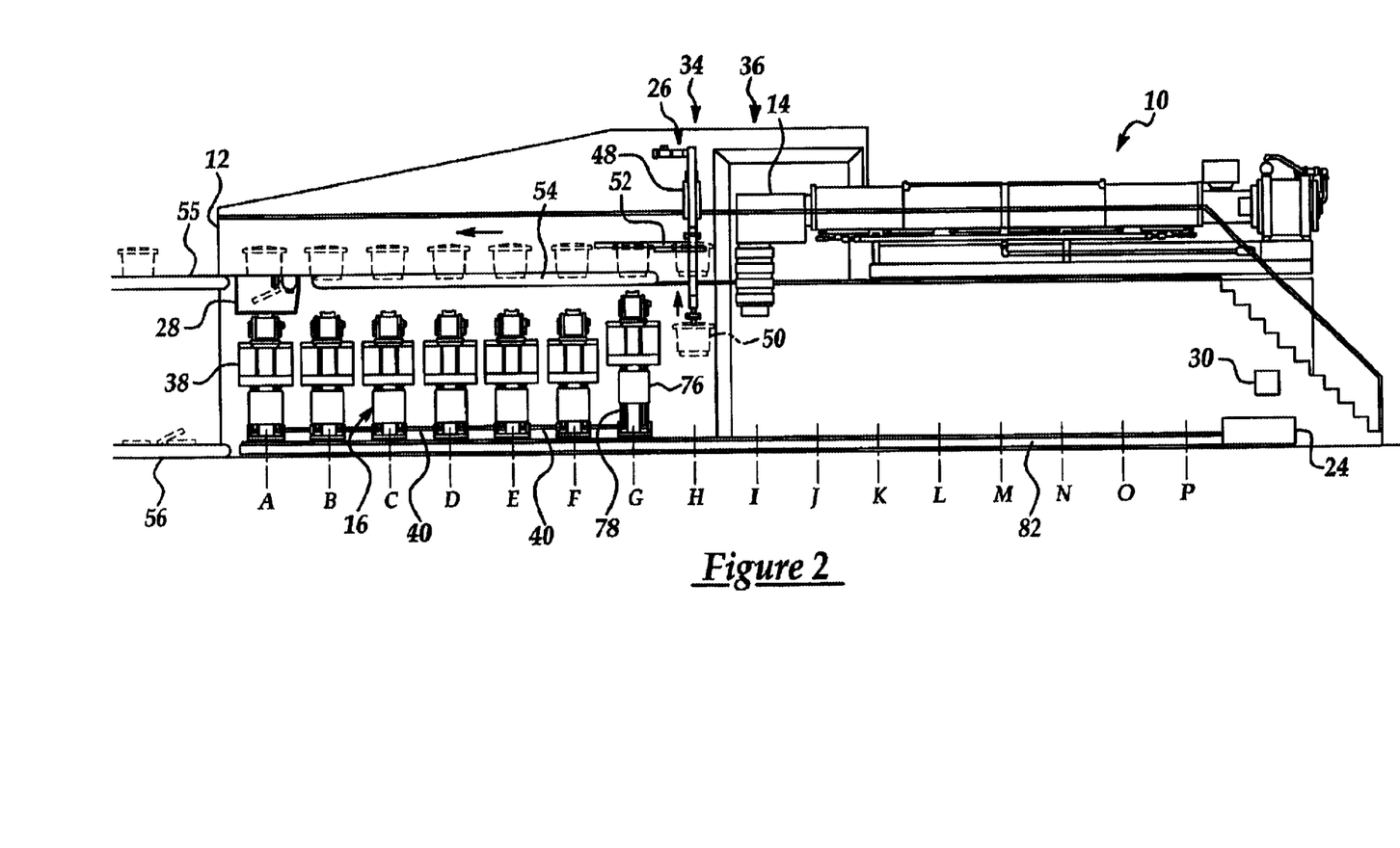
FIG. 2 is an elevation view of the blow molding machine of FIG. 1.

Referring first to FIGS. 1 and 2, there is shown a shuttle blow molding machine, designated generally as 10, which in general includes a mechanical framework 12 supporting a stationary extruder head 14, a number of mold units 16 organized into a first group 18 and a second group 20, a pair of indexers 22, 24 for the two groups of mold units, a takeout mechanism 26, a tail trimmer 28, and a PLC or other electronic controller 30 that controls the overall operation of blow molding machine 10. The extruder head 14 and takeout mechanism 26 are each located at a separate position along a workstation path 32, with the takeout mechanism being located at an article-removal station 34 and the extruder head being located at a parison-receiving station 36.

Each of the mold units includes a mold 38 which can move between a retracted position, in which the mold is spaced laterally from the workstation path 32, and an extended position, in which the mold is centered along the workstation path. All of the mold units 16 within a single group are located in side-by-side relation adjacent each other and are rigidly connected together into a single tram using tie bars 40, with the first group 18 forming a first tram 42 and the second group 20 forming a second tram 44. Each group of molds (i.e., each tram) is located on an opposite side of the workstation path 32. The indexers 22, 24 are connected to the trams 42, 44, respectively, and control movement of them along respective linear paths that are parallel to the workstation path. Thus, for each group 18, 20, the mold units 16 move together along their parallel path as a single unit. Each indexer operates under control of PLC 30 to index its associated tram of mold units in a forward direction among a number of index positions, labeled A through P, following which the tram rapidly transits back in a reverse direction to complete a single cycle. The trams alternate their indexing and return movement so that tram 42 first indexes among the sixteen index positions, and then tram 44 indexes among the same sixteen index positions while the first tram 42 returns in the reverse direction. This initial order of the trams is unimportant so that tram 44 could instead be the first to move through the index positions followed by tram 42, and this ordering becomes lost once the machine completes its first full cycle.

Each tram begins its sequencing cycle at a starting position such as shown in FIGS. 1 and 2 where the seven mold units of each tram are located at the first seven index positions A–G. The tram then indexes in the forward direction so that each mold passes through the workstations 34 and 36, and completes its forward movement when the tram reaches an end position. In the illustrated embodiment, this forward direction is left-to-right so that the end position of the tram is reached when the mold units of that tram arrive at index positions J–P. Once a tram has reached its end position, it returns to the starting position in readiness for the next cycle while the other tram undergoes its indexing through the workstations. As shown, each mold unit 16 is located along a centerline that coincides with one of the index positions. The spacing between the mold unit centerlines (i.e., the center distance between the molds) is therefore equal to the spacing between index positions. Similarly, each workstation is located at a different one of the index positions so that the spacing between index positions equals the spacing between adjacent workstations. The article-removal station 34 coincides with index position H and the parison-receiving station 36 coincides with position I. Where an in-mold labeler is used, it could be located at position I with the extruder head 14 located instead at position J and an additional index position Q being added to the machine. Each of the molds in the two groups 18, 20 can reciprocate between its retracted and extended positions independently of the other molds, although this is not strictly necessary. In this regard, FIG. 1 shows a mold 38 from the first group 18 (at index position G) in its extended position with the remaining molds in their retracted position and, similarly, FIG. 2 depicts a single mold 38 from the second group 20 (at index position G) in its extended position. Specific details of the sequencing of the molds through the workstations and the transverse movement of the individual molds relative to the direction of tram movement will be discussed in greater detail further below.

With continued reference to FIGS. 1 and 2, the takeout mechanism 26 is a two-part device that includes a vertical slide 48 carrying an article gripper which removes a blown article 50 from the mold currently located at the article-removal station 34, and raises it up to a horizontal transfer mechanism 52 that takes article 50 and carries it a short distance to a split conveyor 54 for conveyance to the tail trimmer 28. Once the tail has been removed, a takeout conveyor 55 carries the article 50 from the machine 10 and a scrap conveyor 56 located under the tail trimmer 28 carries the separated tail to a scrap collection bin (not shown).

The construction and operation of the extruder head 14 and the various processing and feed equipment utilized in conjunction with the extruder head 14 can be conventional machinery which is well known in the art. As shown, additional feed conveyors 58, 60 can be provided for use in forming multi-layer articles. The construction and use of such devices is also well known. Furthermore, the other portions of blow molding machine not specifically described herein are also well known to those skilled in the art and need not be elaborated upon since conventional designs can be used for those portions. This includes the tail trimmer 28, conveyors 54–56, indexers 22, 24, and even the molds 38, although some detail is provided herein to show how the molds can be utilized as a part of the invention. Similarly, the construction, programming, and use of the PLC 30, including its interconnects with the various actuators and sensors used to control the operation and coordination of the various devices on machine 10, is well known to those skilled in the art and, apart from its use in implementing the sequencing of machine 10, no further details of PLC 30 are necessary to enable those skilled in the art to implement it as a part of blow molding machine 10.

Figure 3:
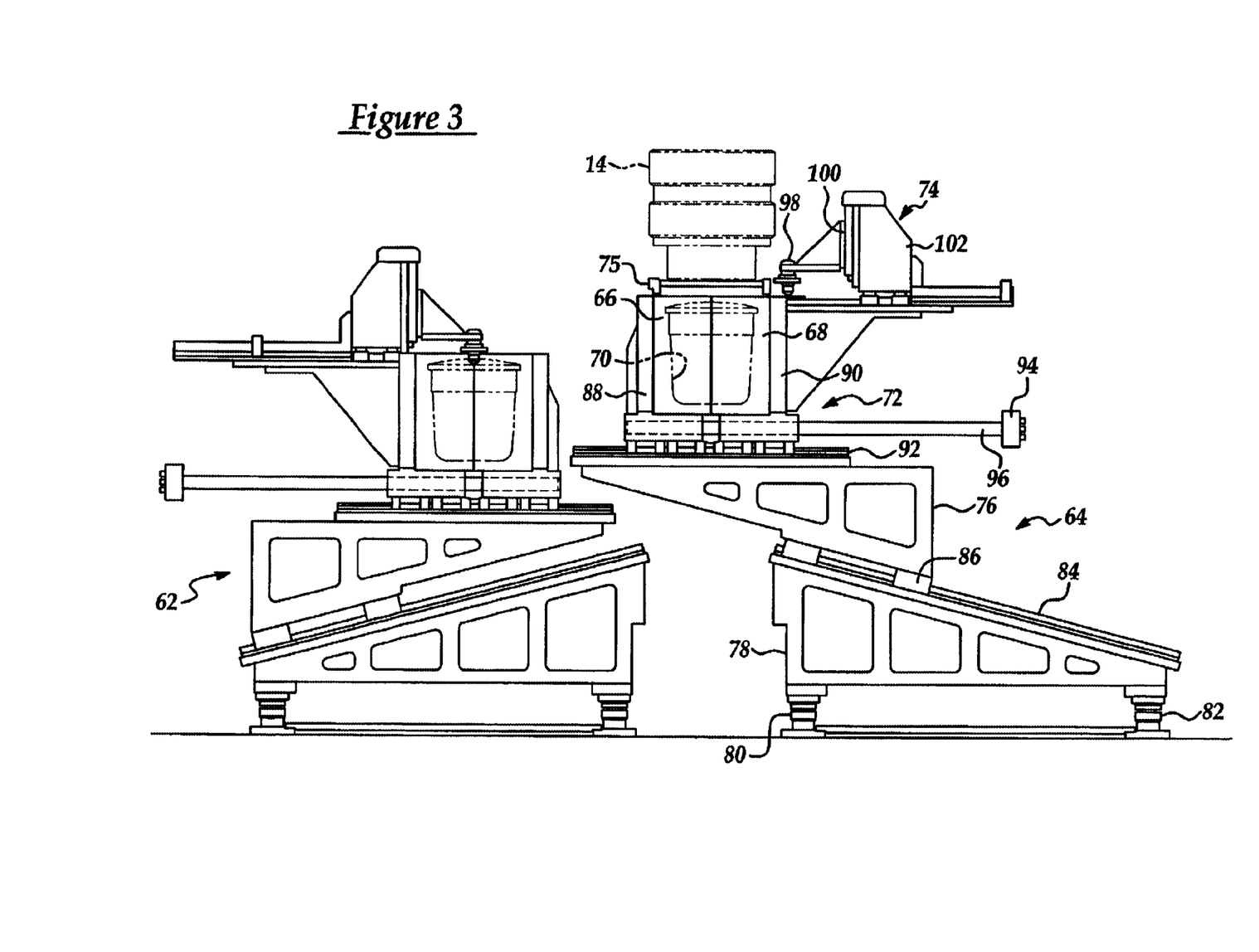
FIG. 3 is an end view of the blow molding machine of FIGS. 1 and 2 showing two mold units in greater detail.

With reference now to FIG. 3, an end view of the machine 10 is shown depicting two mold units 16 (one from each group), a first one (62) of which has its mold 38 in its retracted position and a second one (64) of which has its mold 38 in its extended position underneath extruder head 14 at the parison-receiving station 36. Only the details of construction of the mold unit 64 will be described below and it will be understood that the description applies equally to all of the mold units 16 which are, but need not be, identical in construction and operation. Each mold 38 comprises a pair of mold halves 66, 68 which, when mated together, form one or more mold cavities 70. In addition to mold 38, each mold unit 16 includes a clamp 72 that holds the mold halves, a blow pin assembly 74 mounted on the clamp, a carriage 76 that is used to transfer the mold between its retracted and extended positions, and a base 78 that supports the carriage. The base 78 of each mold unit is used to connect the mold units within a particular group together into a single one of the trams. Each base 78 is mounted on a pair of rails 80, 82 and includes rollers or another suitable interface with the rails which allows the base to move along the rails between the index positions under the control of the indexer 24. Each mold unit 16 is rigidly attached to its adjacent mold units by way of the tie bars 40 shown in FIG. 2 which connect between the bases. In this way, the entire tram moves along the rails as a single unit. The indexer for each tram can be mechanically connected to a single one of the mold units so that the other mold units are pulled or pushed by the forces transmitted through the tie bars. Alternatively, the indexer can be connected to each mold unit so that it imparts equal force to all of the mold units as it moves them along the rails between index positions. Various implementations of the indexer can be utilized including, for example, a screw drive, stepper motor, servo motor, or linear actuator. As a more specific example, the indexers can be implemented using a rack that runs parallel to the rails and is connected to each of the mold units, with the rack being movable in the forward and reverse direction using a drive gear that is connected to a servo motor via a gear box. In this case, the indexers could be located centrally in the machine, such as below the parison-receiving station, where the drive gear can engage the rack regardless of tram position. Other such implementations of indexers 22, 24 will be apparent to those skilled in the art.

The base 78 has an inclined upper surface on which is mounted a pair of carriage slides 84 which support the carriage 76 via two pairs of guide blocks 86. The carriage slides 84 and guide blocks 86 permit the carriage to be moved up and down the inclined surface relative to the base 78 using a linear actuator (not shown). In this way, the mold 38 can move between its retracted and extended positions and it will be appreciated that this movement is in a direction transverse to the workstation path 32. The inclined movement is used to drop the mold down away from the extruder head during retraction of the mold to avoid resticking of the parison, as is well known. The blow molding machine 10 can also include an optional cutter 75 located just below the extruder head 14 to separate the continuous parison extruded from the machine. The clamp 72 is supported on the carriage 76 and includes a pair of opposing clamp members 88, 90 that each hold one of the two mold halves 66, 68. The clamp members 88, 90 are supported on a clamp slide 92 that permits them to move toward and away from a central plane that is aligned with the workstation path 32 when the mold is in its extended position. In this way, the clamp is operable to move the mold halves 66, 68 between an open position, in which the mold halves are spaced from each other, and a closed position, in which the mold halves are mated together to define the mold cavity 70. This opening and closing motion is produced by a linear actuator (not shown) that moves one of the clamp members which causes equal and opposite movement of the other clamp member through a linkage having a fixed center pivot. This linkage is seen in hidden lines in its two positions in FIG. 1. The linkage transfers its motion to a cross piece 94 and clamp tie bars 96 which are securely connected to the other clamp member. This clamp construction is well known and it will be appreciated by those skilled in the art that any of a number of other clamp designs can be used. See, for example, the clamps of U.S. Pat. No. 4,421,472 to Martin, Jr., U.S. Pat. No. 4,998,873 to Martin et al., U.S. Pat. No. 5,388,981 to Scharrenbroich, and U.S. Pat. No. 5,399,083 to Wollschläger. The entire contents of these four patents are hereby incorporated by reference.

Blow pin assembly 74 is supported by clamp 72 and can be mounted on clamp member 90. The blow pin assembly provides two-axis motion to a blow pin 98 that can move from a retracted position away from the mold (as shown on mold unit 64) to an inserted position in which the blow pin is inserted into a hole in the mold (as shown on mold unit 62). The blow pin 98 is mounted on a platen or sub-base 100 that can move vertically relative to a carriage 102 which is mounted for horizontal movement. To move from the retracted to the inserted position, the carriage 102 is first moved horizontally until the blow pin reaches an alignment position located directly above the hole in the mold. Thereafter, the platen 100 is moved vertically downward until the blow pin is firmly seated within the hole. Pressurized gas such as air is then introduced into the parison within the mold cavity to expand the parison according to the well known blow molding technique. Details of the construction and use of blow pin assembly 74 are given in U.S. Pat. No. 5,971,741 to Weber, the entire contents of which are hereby incorporated by reference. If desired, the blow pin can also provide neck finishing on the blown article 50, as described in U.S. Pat. No. 4,919,607 to Martin et al., the entire contents of which are also hereby incorporated by reference.

Figure 4:
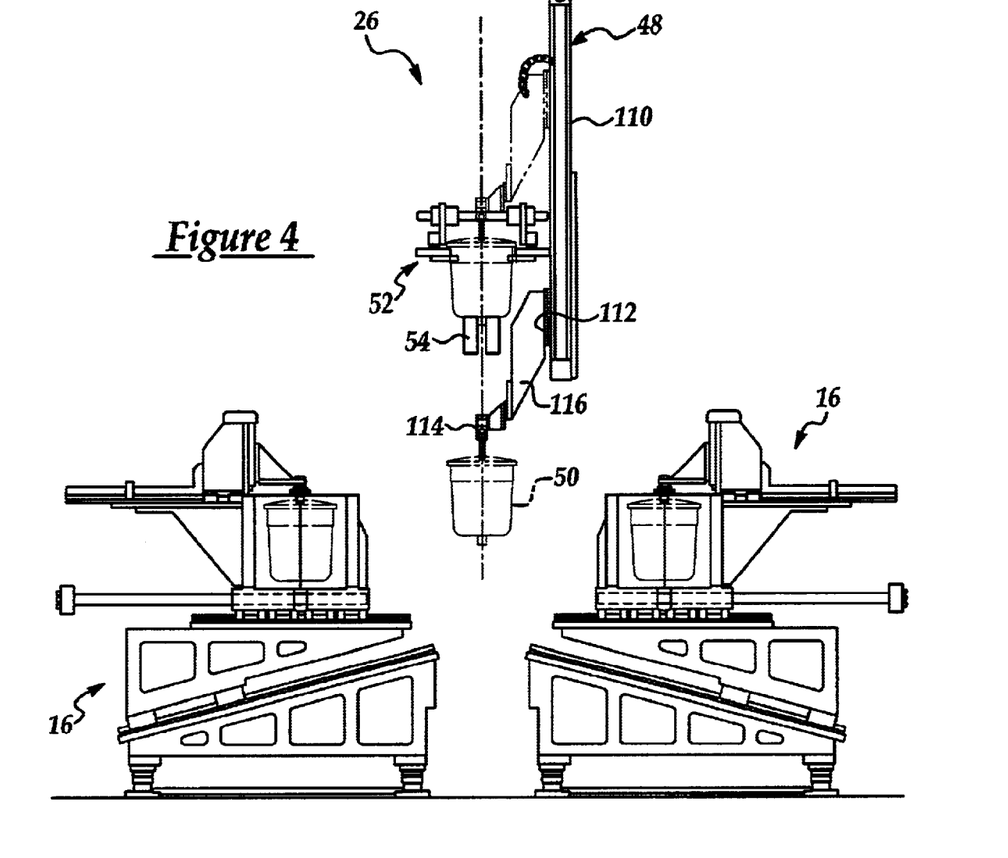
FIG. 4 is an end view as in FIG. 3 showing the takeout mechanism of the blow molding machine of FIGS. 1 and 2.
Figure 5:
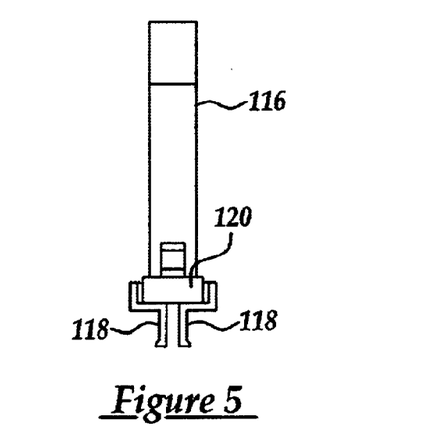
FIG. 5 is a side view of a portion of the takeout mechanism of FIG. 4 showing the article gripper in greater detail.

Turning now to FIGS. 4 and 5, takeout mechanism 26 will now be described in greater detail. As mentioned above, the takeout mechanism is a two-part device that includes a vertical slide 48 and a horizontal transfer mechanism 52. Vertical drive 48 includes a fixed base 110 and a servo-driven platen 112 that supports tooling in the form of an article gripper 114 that is connected to the platen by an extension plate 116. The platen 112 lowers the article gripper 114 to an article-pickup position, where the article gripper 114 engages a blown article 50 located within the mold currently located at the article-removal station, and then raises the article to an upper, intermediate position where the horizontal transfer mechanism 52 picks up the article, allowing it to be released by the article gripper 114. The article 50 is then transferred horizontally to the split conveyor 54 and released. The article gripper 114 is shown in greater detail in FIG. 5 and includes a pair of opposing fingers 118 that move toward and away from each other by virtue of a linear actuator 120. In operation, the platen 112 moves down toward the article-pickup position with the fingers 118 retracted toward each other. As the article gripper 114 reaches the article-pickup position at its lower end of travel, the fingers 118 enter the mold 38 through the blow pin hole and, as the mold is opened up by the clamp 72, actuator 120 is operated to spread the fingers 118 apart so that they engage the inside surface of the article 50 at the blow pin opening. Once the mold 38 has fully opened so that the article is clear of the two mold halves, the vertical slide 48 is activated to move the platen 112 upwardly until the article reaches the intermediate position. The horizontal transfer mechanism 52 then takes hold of the article and the fingers 118 again retract toward each other releasing the article. As the happens, the platen 112 is moved further upwards a short distance to fully remove the fingers from the article. The horizontal transfer mechanism 52 then moves the article to the article-release position at split conveyor 54.

The transfer mechanism 52 includes an opposing pair of grippers 122 which have a contour that generally matches that of the outer surface of the article 50. The grippers hold the article by moving inwardly toward each other until they apply slight pressure to the outside of the article. The grippers 122 can include a surface material such as rubber to help prevent the article from slipping while being held by the grippers. A linear actuator (not shown) is used to provide the horizontal movement of the grippers between the intermediate position and the article-release position. The opposing movement of the grippers 122 to grasp and release the article can be accomplished in any of a number of ways that will be apparent to those skilled in the art, including using a linear actuator or mounting each of the grippers on a track that brings them together as they arrive back at the intermediate position and that separates them as they arrive at the article-release position.

Figure 6A:
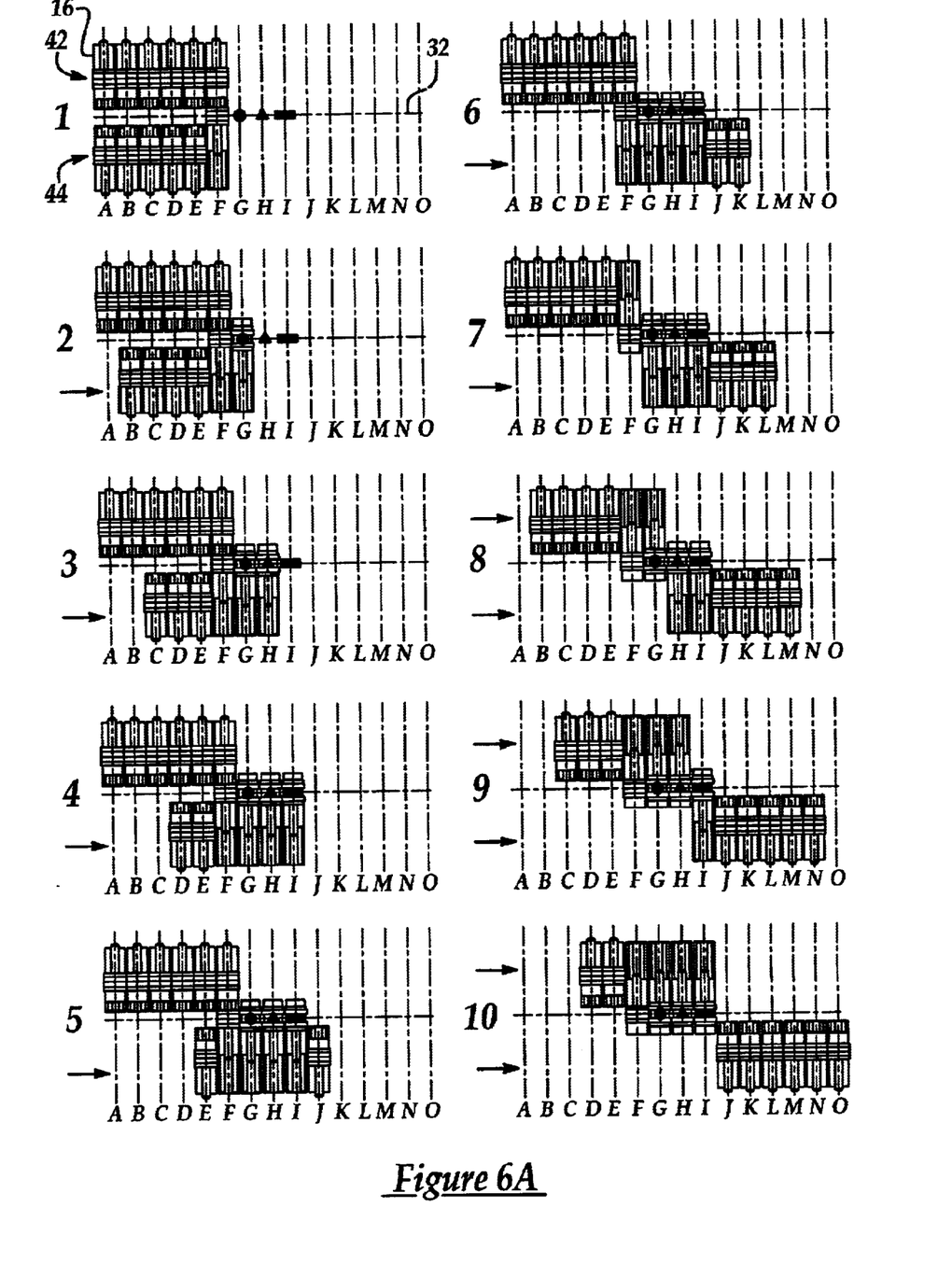
FIGS. 6A and 6B together depict a sequencing of mold units that can be employed by the blow molding machine of FIGS. 1 and 2.
Figure 6B:
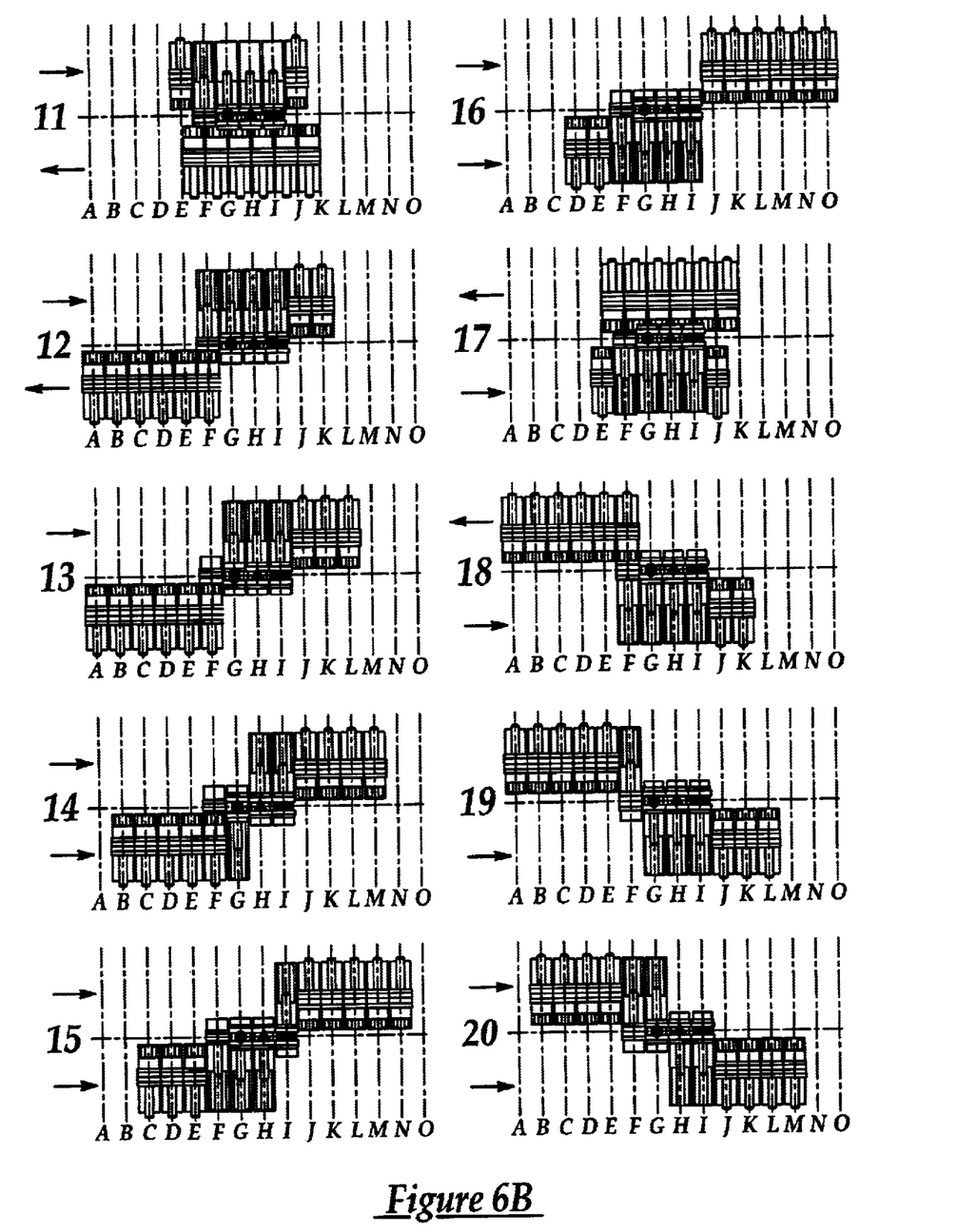

FIGS. 6A and 6B together depict the sequencing of the trams and molds through the machine. This sequencing is carried out under control of PLC 30 which is connected to the indexers, mold units, and takeout mechanism to provide control signals to those devices for the purpose of coordinating movement of the indexers, carriages, clamps, blow pin assemblies, and takeout mechanism. Each of the twenty steps shown depict an individual state of the machine and the unmarked arrows indicate the tram movement involved at arriving at that state from the previous state. As described generally above, the mold units undergo repetitive cycles in which the mold units of the first and second groups are indexed in the forward direction along their respective paths from their starting position, through the various workstations to an end position, and then are moved in the return direction along their respective paths back to the starting position. When the molds are moving in the forward direction, the molds are moved from their retracted position toward their extended position prior to entering the first workstation and then are moved back to their retracted position after leaving the last workstation. The mold units of the first group are indexed together sequentially through the workstations followed by the mold units of the second group which are indexed together sequentially through the workstations while the mold units of the first group return to their starting position. In the diagram of FIGS. 6A and 6B, three workstations are included, an article-removal (takeout) station identified at position G by the circle, an in-mold labeling (IML) station identified at position H by the triangle, and a parison-receiving (extruder) station identified at position I by the rectangle.

The state indicated in step 1 is representative of an initial (machine startup) state. In fact, for this embodiment, the first five states will only occur during the initial cycle, with the twelve states indicated at steps 6–17 representing a complete cycle of the machine. As will be appreciated, steps 18–20 are identical to steps 6–8, respectively. In step 1, the right-most mold has been moved to its extended position in line with the workstation path 32. Next, the tram 44 is moved in the forward direction one index position so that the right-most mold is located at the article-removal station (position G). At the same time, the second mold is advanced to its extended position. This is shown in step 2. For the first cycle, there will of course be no article to remove from any of the molds. Next, tram 44 again moves one position to the right, bringing its right-most mold under the in-mold labeler and the second mold under the takeout mechanism, with the third mold being advanced to its extended position. This is shown in step 3. At this point, the in-mold labeler inserts one or more labels into the mold cavity. Suitable IML mechanisms are well known. See, for example, U.S. Pat. No. 5,919,498 to Weber et al., the entire contents of which are hereby incorporated by reference. Next, the tram 44 moves another step to the state of step 4, thereby bringing the right-most mold under the extruder head, the second mold under the IML, and the third mold under the takeout mechanism. Parison extrusion now begins with the right-most mold closing on and capturing the parison between the mold halves. Upon the next forward movement of tram 44 to the state shown in step 5, the right-most mold is moved out of the parison-receiving station, with the carriage being activated to retract the mold and the blow pin assembly being activated to advance the blow pin to its inserted position in the mold. By locating the blow pin on the clamp itself, there is no need for a separate blow pin station following the parison-receiving station, although such a station could be used in lieu of the individual, clamp mounted blow pins. This forward direction sequencing continues until step 7, at which point the last mold of tram 44 has moved to position G, thereby enabling the right-most mold of the other tram 42 to move to its extended position in readiness for operations at the workstations. Thus, tram 42 begins its sequencing in synchronism with tram 44. As shown in step 8, tram 42 begins its forward indexing immediately following tram 44 so that the right-most mold of tram 42 is indexed to maintain it at one index position behind the left-most mold of tram 44. This sequencing continues until step 10 at which point tram 44 has reached its end position with all of its molds retracted back from the workstation path.

In steps 11 and 12, tram 42 continues its indexing through the workstations while tram 44 returns in one continuous motion back to its starting position. Depending upon the speed of return of tram 44, it may either wait at its starting position for tram 42 to fully clear from the first six index positions or may arrive back at its starting position just in time to begin another cycle of sequencing in the forward direction. In either event, at steps 12–16 tram 42 continues indexing through the various workstations towards its end position, with tram 44 following behind for a second cycle. Once it reaches its end position, tram 42 returns to its starting position in the same manner as was done by tram 44. This is shown in steps 17 and 18, at which point the state of the blow molding machine 10 is the same as that shown back at step 6. Thus, a second cycle of steps 6–17 begins and this cycle is repeated as many times as desired.

It will be appreciated that, as indicated in the various states shown, the molds can be extended to the workstation path prior to the transverse movement of the tram to bring them into the first workstation. Similarly, the molds can be held at their extended positions until after they have been moved from the last workstation to the next successive index position. Alternatively, the movement of the molds between their retracted and extended positions can occur simultaneously with the lateral movement of the tram so that, for example, a mold moves from its retracted position at position F to its extended position at position G (under the takeout mechanism) along a path that is not orthogonally related to the workstation path. Similarly, the molds can move from their extended state at position I (under the extruder head) to their retracted position while the tram moves the mold to position J. Moreover, although the disclosed embodiment involves independent movement of the molds between their retracted and extended positions, it will be understood that, for each group, a single carriage could be used to support the molds so that they move as a group between their retracted and extended positions. The particular choice in these various approaches involves a trade off between modularity of design and simplicity of construction and sequencing.

It is worth noting that, apart from the addition of the in-mold labeling station, each tram in FIGS. 6A and 6B include six mold units, rather than the seven shown in FIGS. 1 and 2. These differences highlight an advantage of the disclosed embodiment; namely, the ease of modifying the machine 10 to accommodate different numbers of workstations and mold units according to a particular application. Especially where the mold units include individual bases that are adjustable in spacing relative to each other, the machine 10 provides a modular construction that can be particularized for different production runs with little effort.

These differences also demonstrate another feature of the disclosed embodiment; that is, the relationship between the number of mold units in each group, the number of workstations, and the required number of index positions. For any arbitrary number m of adjacent workstations and number n of adjacent mold units within each tram, there are 2n+m index positions among which the mold units are indexed. In FIGS. 1 and 2, there are two workstations and seven mold units in each group so that m=2 and n=7 for a total of sixteen index positions. In FIGS. 6A and 6B, there are three workstations and six mold units so that m=3 and n=6 for a total of fifteen index positions. Furthermore, it will be appreciated that a lesser number of index positions can be utilized in the event that the movement of the trams between index positions can be coordinated with the extension and retraction of the molds so that, for example, index positions A and O in FIGS. 6A and 6B could be eliminated. Eliminating the first index position A would necessitate the last mold from one tram indexing out of the first (article takeout) workstation before the first mold of the other tram could be advanced to its extended position under that workstation. Similarly, eliminating the last index position O would necessitate the last mold of the leading tram retracting away from the last (extruder) workstation before the first mold of the other tram could be indexed into that workstation. In this arrangement, the machine would include 2(n–1)+m index positions. Thus, the blow molding machine will have at least 2(n–1)+m index positions and, for purposes of ease of coordination of movement, will desirably have 2n+m positions.

For continuous processing, where each workstation performs an operation in between each indexing step, there is only a limited amount of time available for the return trip of each tram from its end position back to its starting position. This time is also dependent upon the number of workstations and mold units in each group. In particular, for m workstations and two groups of n mold units, the return trip must be completed in less than n–m+1 index periods, where an index period equals the amount of time between the start of successive indexes of the trams. Preferably, the return trip is accomplished within n–m index periods.

A couple other features of the disclosed embodiment are worth noting. Referring back to FIG. 2, the tie bars 40 permit the center distances between the mold units to be adjusted as necessary or desirable for a particular application, and permits easy addition or removal of mold units so that the total number of mold units can be changed from one production run to the next. However, if desired, a common base could be used for each tram so that the carriages supporting the molds in that tram are all mounted on the common base. Apart from the mold units, the positioning of at least some of the workstations is also adjustable to accommodate changes in the mold unit center distances. Preferably, the parison-receiving station is in a fixed position, with the relative positioning of the takeout mechanism 26 and any in-mold labeling or other workstations being adjustable so that their spacing can equal whatever center distance exists between the mold units 16. Mounting techniques that permit this relative adjustment are well known in the art. Also, although a single mold cavity is shown, it will be appreciated that for smaller articles, each mold can include two or more mold cavities, in which case the extruder head 14, blow pin assembly 74, takeout mechanism 26, conveyor 54, and tail trimmer 28 would all be suitably modified to provide the proper simultaneous processing of the multiple articles. Thus, for example, a separate extruder port, blow pin, and article gripper would be provided for each mold cavity. Such modifications are within the level of skill in the art.

It will thus be apparent that there has been provided in accordance with the present invention a multi-station shuttle blow molding machine which achieves the aims and advantages specified herein. It will of course be understood that the foregoing description is of an exemplary embodiment of the invention and that the invention is not limited to the specific embodiment shown. Various changes and modifications will become apparent to those skilled in the art. For example, the controller 30 need not be a PLC or even a centralized controller, but can comprise distributed sensors (limit switches, optical switches, magnetic switches, etc.) connected to control the various actuators needed to achieve the desired sequencing. All such variations and modifications are intended to come within the scope of the appended claims.

I claim:

1. A shuttle blow molding machine comprising:
an extruder head located at a parison-receiving station;
a takeout mechanism located at an article-removal station, the parison-receiving station and the article-removal station being located at spaced positions along a horizontal workstation path;
first and second groups of mold units, wherein each of the mold units has a carriage, clamp, mold, and blow pin assembly, the mold including a pair of mold halves located in the clamp with the mold being movable by the clamp between an open position, in which the mold halves are spaced from each other, and a closed position, in which the mold halves are mated together to define one or more mold cavities, the blow pin assembly being supported by the clamp and including one or more blow pins that are movable between a retracted position away from the mold and an inserted position in which the one or more blow pins are inserted into one or more corresponding holes within the mold to deliver pressurized gas to the one or more mold cavities, the clamp being mounted on the carriage with the carriage being movable in a direction transverse to the horizontal workstation path such that the mold can reciprocate between a retracted position, in which the mold is spaced from the workstation path, and an extended position, in which the mold is centered along the workstation path;
the mold units within the first group being located in side-by-side relation adjacent each other and being movable as a group along a first path that is parallel to the workstation path, the mold units within the second group being located in side-by-side relation adjacent each other and being movable as a group along a second path that is parallel to the workstation path, with the first and second groups of mold units being located on opposite sides of the workstation path.

2. A shuttle blow molding machine as defined in claim 1, wherein each group of mold units is indexed along its parallel path among a number of different index positions, at least some of which coincide with the parison-receiving and article-removal stations.

3. A shuttle blow molding machine as defined in claim 2, wherein the carriage of each mold unit moves its associated mold between the retracted and extended positions during indexing of the mold unit along its parallel path.

4. A shuttle blow molding machine as defined in claim 2, wherein, within each group, the mold units are located along centerlines that are spaced by a distance equal to the distance between adjacent index positions.

5. A shuttle blow molding machine as defined in claim 1, wherein the mold units of each group are spaced from the other mold units in the same group by a distance that is adjustable.

6. A shuttle blow molding machine as defined in claim 1, wherein the carriage of each mold unit is independently movable in the transverse direction relative to the other carriages, whereby each mold can move into and out of the workstation path independently of the other molds.

7. A shuttle blow molding machine as defined in claim 1, wherein each mold unit includes its own individual base.

8. A shuttle blow molding machine as defined in claim 7, wherein each mold unit further comprises carriage slides mounted on the base, with the carriage being mounted on the carriage slides for reciprocal movement of its associated mold between the retracted and extended positions.

9. A shuttle blow molding machine as defined in claim 8, wherein each carriage is movable upwardly towards the workstation path along an inclined path.

10. A shuttle blow molding machine as defined in claim 7, wherein the mold units of each group are connected to the other mold units in the same group by connecting their bases together to form a tram that moves as a single unit along its parallel path.

11. A shuttle blow molding machine as defined in claim 1, further comprising first and second indexers connected to the first and second groups of mold units, respectively, wherein each of the indexers is operable to index its associated group of mold units along its parallel path.

12. A shuttle blow molding machine as defined in claim 11, further comprising a controller connected to the takeout mechanism, indexers, and mold units, the controller being operable to coordinate operation of the takeout mechanism, indexers, carriage, clamps, and blow pin assemblies.

13. A shuttle blow molding machine as defined in claim 12, wherein the controller is operable to advance the mold units through repetitive cycles in which the mold units of the first and second groups are indexed in a forward direction along their respective paths from a starting position, through the article-removal and parison-receiving stations, to a end position, and then are moved in a return direction along their respective paths from the end position back to the starting position, wherein, when the mold units are moving in the forward direction, the molds are moved from their retracted position toward their extended position prior to entering the article-removal station and then are moved back to their retracted position after leaving the parison-receiving station, and wherein the mold units of the first group are indexed together sequentially through the stations followed by the mold units of the second group which are indexed together sequentially through the stations while the mold units of the first group return to their starting position.

14. A shuttle blow molding machine as defined in claim 1, wherein said takeout mechanism includes an article gripper, vertical slide, and horizontal transfer mechanism, wherein the article gripper is supported by the vertical slide, with the takeout mechanism being operable to lower the article gripper to an article-pickup position where the article gripper is operable to engage a blow molded article located in one of the molds, then raise the article gripper along with the removed article to an upper, intermediate position, and then horizontally move the article to an article-release position using the horizontal transfer mechanism.

15. A shuttle blow molding machine as defined in claim 14, further comprising a conveyor located at the article-release position, wherein the horizontal transfer mechanism is operable to release the article onto the conveyor at the article-release position, and the conveyor is operable to carry the article away from the takeout mechanism for subsequent processing.

16. A shuttle blow molding machine as defined in claim 1, wherein the blow molding machine includes m workstations spaced along the workstation path including at least the parison-receiving station and the article-removal station, and wherein each of the first and second groups of mold units include n mold units in each group, with each group of mold units indexing along its parallel path among at least 2(n−1)+m index positions.

17. A shuttle blow molding machine comprising:
an extruder head located at a parison-receiving station;
a takeout mechanism located at an article-removal station, the parison-receiving station and the article-removal station being located at spaced positions along a workstation path;
first and second groups of mold units, wherein the first and second groups are located on opposite sides of the workstation path and wherein each of the mold units includes a mold that is movable in a direction transverse to the workstation path such that the mold can reciprocate between a retracted position, in which the mold is spaced from the workstation path, and an extended position, in which the mold is centered along the workstation path;

first and second indexers connected to the first and second groups of mold units, respectively, wherein each of the indexers is operable to move its associated group of mold units together along a path that is parallel to the workstation path; and a controller connected to the mold units and indexers, the controller being operable to provide control signals to the mold units to control movement of the molds between the extended and retracted positions and being operable to provide control signals to the indexers to control movement of the groups of mold units along the parallel paths;

wherein the controller is operable to advance the mold units through repetitive cycles in which the mold units of the first and second groups are indexed in a forward direction along their respective paths from a starting position, through the article-removal and parison-receiving stations, to a end position, and then are moved in a return direction along their respective paths from the end position back to the starting position, wherein, when the mold units are moving in the forward direction, the molds are moved from their retracted position toward their extended position prior to entering the article-removal station and then are moved back to their retracted position after leaving the parison-receiving station, and wherein the mold units of the first group are indexed together sequentially through the stations followed by the mold units of the second group which are indexed together sequentially through the stations while the mold units of the first group return to their starting position.

18. A shuttle blow molding machine as defined in claim 17, wherein each of the mold units includes a carriage, clamp, and blow pin assembly, the mold including a pair of mold halves located in the clamp with the mold being movable by the clamp between an open position, in which the mold halves are spaced from each other, and a closed position, in which the mold halves are mated together to define one or more mold cavities, the blow pin assembly being supported by the clamp and including one or more blow pins that are movable between a retracted position away from the mold and an inserted position in which the one or more blow pins are inserted into one or more corresponding holes within the mold to deliver pressurized gas to the one or more mold cavities, the clamp being mounted on the carriage with the carriage being movable in the transverse direction such that the mold can reciprocate between its retracted and extended positions.

19. A shuttle blow molding machine as defined in claim 18, wherein the carriage of each mold unit moves its associated mold between the retracted and extended positions during indexing of the mold unit along its parallel path.

20. A shuttle blow molding machine as defined in claim 18, wherein the controller is connected to the takeout mechanism, indexers, and mold units, the controller being operable to coordinate operation of the takeout mechanism, indexers, carriage, clamps, and blow pin assemblies.

21. A shuttle blow molding machine as defined in claim 17, wherein the mold units within the each group are located in side-by-side relation adjacent each other and are movable as a group along their parallel path.

22. A shuttle blow molding machine as defined in claim 17, wherein, within each group, the mold units are located along centerlines that are spaced by a distance equal to the distance between adjacent workstations.

23. A shuttle blow molding machine as defined in claim 17, wherein the mold units of each group are spaced from the other mold units in the same group by a distance that is adjustable.

24. A shuttle blow molding machine as defined in claim 17, wherein each mold is independently movable relative to the other molds between its retracted and extended positions.

25. A shuttle blow molding machine as defined in claim 17, wherein each mold unit includes its own individual base.

26. A shuttle blow molding machine as defined in claim 25, wherein each mold unit further comprises carriage slides mounted on the base, with the mold being supported on the carriage slides for reciprocal movement between the retracted and extended positions.

27. A shuttle blow molding machine as defined in claim 26, wherein each mold is movable upwardly towards the workstation path along an inclined path.

28. A shuttle blow molding machine as defined in claim 25, wherein the mold units of each group are connected to the other mold units in the same group by connecting their bases together to form a tram that moves as a single unit along its parallel path.

29. A shuttle blow molding machine as defined in claim 17, wherein the controller is operable to advance the mold units through repetitive cycles in which the mold units of the first and second groups are indexed in a forward direction along their respective paths from a starting position, through the article-removal and parison-receiving stations, to a end position, and then are moved in a return direction along their respective paths from the end position back to the starting position, wherein, when the mold units are moving in the forward direction, the molds are moved from their retracted position toward their extended position prior to entering the article-removal station and then are moved back to their retracted position after leaving the parison-receiving station, and wherein the mold units of the first group are indexed together sequentially through the stations followed by the mold units of the second group which are indexed together sequentially through the stations while the mold units of the first group return to their starting position.

30. A shuttle blow molding machine as defined in claim 17, wherein said takeout mechanism includes an article gripper, vertical slide, and horizontal transfer mechanism, wherein the article gripper is supported by the vertical slide, with the takeout mechanism being operable to lower the article gripper to an article-pickup position where the article gripper is operable to engage a blow molded article located in one of the molds, then raise the article gripper along with the removed article to an upper, intermediate position, and then horizontally move the article to an article-release position using the horizontal transfer mechanism.

31. A shuttle blow molding machine as defined in claim 30, further comprising a conveyor located at the article-release position, wherein the horizontal transfer mechanism is operable to release the article onto the conveyor at the article-release position, and the conveyor is operable to carry the article away from the takeout mechanism for subsequent processing.

32. A shuttle blow molding machine as defined in claim 17, wherein the blow molding machine includes m workstations spaced along the workstation path including at least the parison-receiving workstation and the article-removal workstation, and wherein each of the first and second groups of mold units include n mold units in each group, with each group of mold units indexing along its parallel path among at least 2(n−1)+m index positions.

33. A shuttle blow molding machine comprising:
m workstations spaced along a horizontal workstation path, the workstations including at least a parison-receiving station and an article-removal station; and
first and second groups of mold units, wherein the first and second groups each have n mold units and are located on opposite sides of the workstation path, each of the mold units including a mold that is movable in a direction transverse to the workstation path such that the mold can reciprocate between a retracted position, in which the mold is spaced from the workstation path, and an extended position, in which the mold is centered along the workstation path;
wherein each group of mold units indexes along a path parallel to the workstation path among at least 2(n−1)+m index positions.

34. A shuttle blow molding machine as defined in claim 33, wherein each of the mold units includes a carriage, clamp, and blow pin assembly, the mold including a pair of mold halves located in the clamp with the mold being movable by the clamp between an open position, in which the mold halves are spaced from each other, and a closed position, in which the mold halves are mated together to define one or more mold cavities, the blow pin assembly being supported by the clamp and including one or more blow pins that are movable between a retracted position away from the mold and an inserted position in which the one or more blow pins are inserted into one or more corresponding holes within the mold to deliver pressurized gas to the one or more mold cavities, the clamp being mounted on the carriage with the carriage being movable in the transverse direction such that the mold can reciprocate between its retracted and extended positions.

35. A shuttle blow molding machine as defined in claim 34, wherein the carriage of each mold unit moves its associated mold between the retracted and extended positions during indexing of the mold unit along its parallel path.

36. A shuttle blow molding machine as defined in claim 34, further comprising a controller connected to the takeout mechanism, indexers, and mold units, the controller being operable to coordinate operation of the takeout mechanism, indexers, carriage, clamps, and blow pin assemblies.

37. A shuttle blow molding machine as defined in claim 33, wherein the mold units within the each group are located in side-by-side relation adjacent each other and are movable as a group along their parallel path.

38. A shuttle blow molding machine as defined in claim 33, wherein, within each group, the mold units are located along centerlines that are spaced by a distance equal to the distance between adjacent workstations.

39. A shuttle blow molding machine as defined in claim 33, wherein the mold units of each group are spaced from the other mold units in the same group by a distance that is adjustable.

40. A shuttle blow molding machine as defined in claim 33, wherein each mold is independently movable relative to the other molds between its retracted and extended positions.

41. A shuttle blow molding machine as defined in claim 33, wherein each mold unit includes its own individual base.

42. A shuttle blow molding machine as defined in claim 41, wherein each mold unit further comprises carriage slides mounted on the base, with the mold being supported on the carriage slides for reciprocal movement between the retracted and extended positions.

43. A shuttle blow molding machine as defined in claim 42, wherein each mold is movable upwardly towards the workstation path along an inclined path.

44. A shuttle blow molding machine as defined in claim 41, wherein the mold units of each group are connected to the other mold units in the same group by connecting their bases together to form a tram that moves as a single unit along its parallel path.

45. A shuttle blow molding machine as defined in claim 33, further comprising first and second indexers connected to the first and second groups of mold units, respectively, wherein each of the indexers is operable to index its associated group of mold units along its parallel path.

46. A shuttle blow molding machine as defined in claim 45, further comprising a controller that is operable to provide control signals to the mold units to control movement of the molds between the extended and retracted positions and that is operable to provide control signals to the indexers to control movement of the groups of mold units along the parallel paths.

47. A shuttle blow molding machine as defined in claim 46, wherein the controller is operable to advance the mold units through repetitive cycles in which the mold units of the first and second groups are indexed in a forward direction along their respective paths from a starting position, through the article-removal and parison-receiving stations, to a end position, and then are moved in a return direction along their respective paths from the end position back to the starting position, wherein, when the mold units are moving in the forward direction, the molds are moved from their retracted position toward their extended position prior to entering the article-removal station and then are moved back to their retracted position after leaving the parison-receiving station, and wherein the mold units of the first group are indexed together sequentially through the stations followed by the mold units of the second group which are indexed together sequentially through the stations while the mold units of the first group return to their starting position.

48. A shuttle blow molding machine as defined in claim 33, wherein said takeout mechanism includes an article gripper, vertical slide, and horizontal transfer mechanism, wherein the article gripper is supported by the vertical slide, with the takeout mechanism being operable to lower the article gripper to an article-pickup position where the article gripper is operable to engage a blow molded article located in one of the molds, then raise the article gripper along with the removed article to an upper, intermediate position, and then horizontally move the article to an article-release position using the horizontal transfer mechanism.

49. A shuttle blow molding machine as defined in claim 48, further comprising a conveyor located at the article-release position, wherein the horizontal transfer mechanism is operable to release the article onto the conveyor at the article-release position, and the conveyor is operable to carry the article away from the takeout mechanism for subsequent processing.

50. A shuttle blow molding machine as defined in claim 33, wherein each group of mold units indexes along its parallel path among 2n+m index positions.

* * * * *